W. A. YEATTS.
Hay and Straw Cutter.

No. 211,452.  Patented Jan. 14, 1879.

WITNESSES:
Francis McArdle
C. Sedgwick

INVENTOR:
W. A. Yeatts
BY
ATTORNEYS.

N. PETERS, PHOTO-LITHOGRAPHER, WASHINGTON, D. C.

UNITED STATES PATENT OFFICE.

WILLIAM A. YEATTS, OF LITTLE RIVER, VIRGINIA.

IMPROVEMENT IN HAY AND STRAW CUTTERS.

Specification forming part of Letters Patent No. 211,452, dated January 14, 1879; application filed November 19, 1878.

*To all whom it may concern:*

Be it known that I, WILLIAM A. YEATTS, of Little River, in the county of Floyd and State of Virginia, have invented a new and Improved Hay and Straw Cutter, of which the following is a specification:

This invention relates to that class of cutters in which the hay and straw are subjected to a shear-cut by the reciprocation of the knife or knives in the arc of a circle; and the object thereof is to facilitate the operation by arranging the knife or knives to cut the hay or straw at every stroke thereof backward and forward, and to automatically feed and hold the same for the action of the knife or knives.

It consists in attaching the knife or knives to the cutter-bar so as to shear in reverse directions, and so connecting the cutter-arm with rakes pivoted over the trough or troughs holding the hay or straw to be cut that the said rakes will automatically feed the same to the knives.

The invention further consists of presser bars or plates operated by the rake-shafts, and simultaneously therewith, to alternately hold the hay or straw for the action of the knife or knives, and to release the same for the feeding operation of the rakes.

Figure 1:
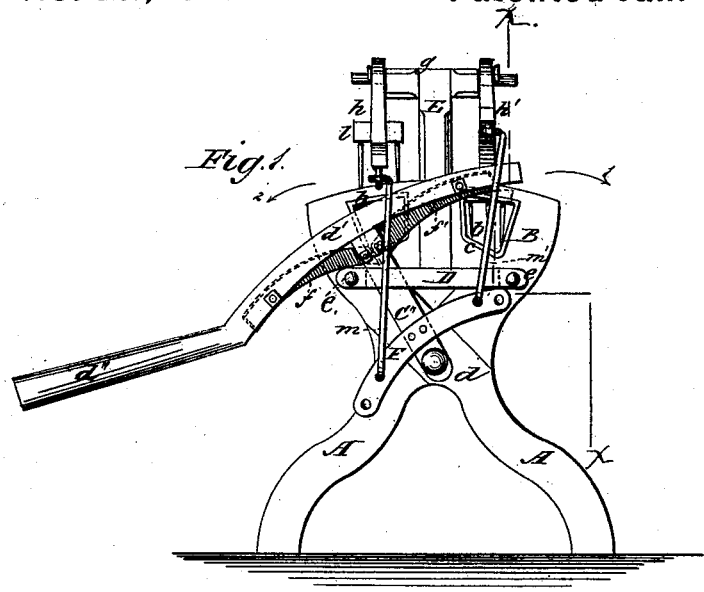
Figure 2:
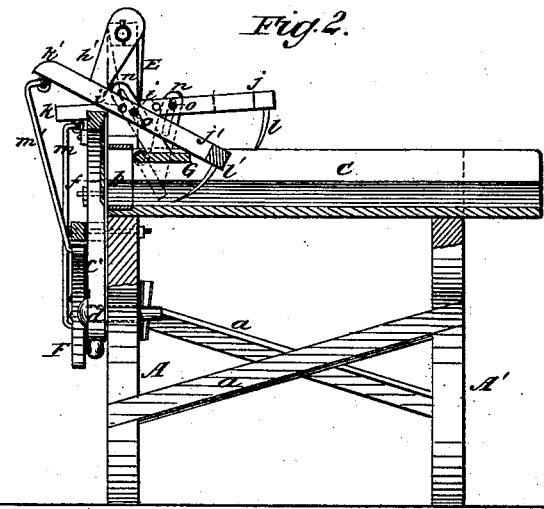
Figure 3:
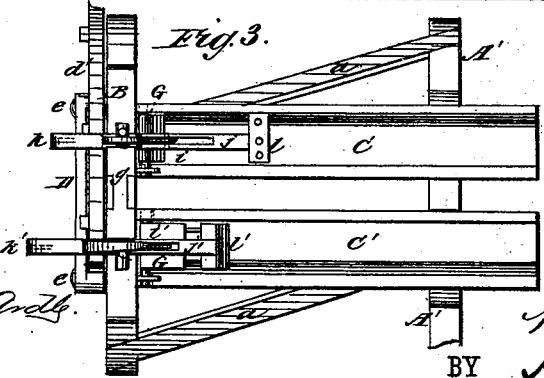

In the accompanying drawings, Figure 1 is an end elevation of my improvement. Fig. 2 is a longitudinal section of the same on line $x\,x$, and Fig. 3 is a top view or plan of the improvement.

Similar letters of reference indicate corresponding parts.

Referring to the drawings, the frame supporting the front of the cutter is indicated by the letter A, and that supporting the rear by the letter A'. The former is extended upward into a housing, B, and the two are connected together by the braces $a\,a$. Entered into the housing B are the open ends $b$ of the troughs C C', placed parallel to each other, and their rear ends supported and fixed to the frame A'. These boxes or troughs have the adjacent sides parallel; but the bottoms are inclined from the middle downward, as at $c$, and their outer sides are likewise flared outward.

At $d$ in frame A is pivoted an arm, C'', the upper end of which is fixed to the cutter-bar $d'$, and the cutter-bar has an extension forming a handle, $d''$. A guard, D, is placed over the arm C'', and fixed to the housing B by studs $e\,e$ at each end. This guard is designed to keep the cutter-bar and knives pressed against the face of the housing, and also to limit the movement thereof back and forth.

The knives are designated by the letters $f$ $f'$. They are segments of circles set into the cutter-bar and arm C'' so as to shear in opposite directions—that is to say, knife $f$ has the end nearest the handle secured into the cutter-bar, while the opposite end is fixed into the arm C'', while the knife $f'$ has its end nearest the handle let into the arm, while its opposite end is fixed in the cutter-bar. By this arrangement cutter $f'$ shears off the hay or straw when the cutter is moved backward, away from the operator, in the direction indicated by the arrow 1, while knife $f$ shears, when drawn toward the operator, in the direction of the arrow 2. As the cutter, in its reciprocating movements, describes an arc of a circle, it will be readily seen that a perfect shear-cut is given every time the cutter is moved backward and forward.

Between the boxes or troughs C C' there rises from the housing B a standard, E, having at its top a cross-head, $g$. To one end of this head is pivoted an arm, $h$, and to the opposite end is pivoted an arm, $h'$. Arm $h$ is fixed to a shaft, $i$, and arm $h'$ to a shaft, $i'$. Shafts $i\,i'$ are respectively parallel with and immediately over the middle of troughs C C', one end, $j\,j'$, projecting over the trough about one-third of its length, while opposite end, $k\,k'$, projects beyond the housing.

To ends $j\,j'$ are fixed the rakes $l\,l'$, respectively, the teeth of which lengthen outwardly, to conform to the incline bottoms of the troughs, into which they enter, as will hereinafter be described.

To the ends $k\,k'$ of the shafts are hooked the upper ends of rods $m\,m'$, respectively, the lower ends being attached to opposite ends of the rock-lever F, which, in turn, is fixed to the arm C''.

When the cutter is being operated the lever is rocked, and, acting on shafts $i\,i'$ through rods $m\,m'$, a rocking motion is given to the shafts, and the rakes being lowered into the troughs and lifted therefrom alternately, describing in the operation arcs of circles, which gives them a raking motion toward the mouths of the troughs and the cutter-knives, so that when the hay or straw is placed in the troughs it is acted upon by the rakes and fed alternately, first to knife $f$, when the cutter is moved in the direction of arrow 1, and then to knife $f'$, when the direction is reversed, the arrangement being such that when the cutter is moved in the direction of arrow 1 knife $f$ passes over the mouth of box C, and the rake $l$ feeds the hay or straw out, and when the direction is reversed the knife $f$ cuts what is fed out, while rake $l'$ feeds the hay or straw out of trough C', ready for the action of knife $f'$. Thus the feeding takes place in one trough, while the cutting takes place from the other, and vice versa.

The presser bars or plates are represented by the letters G G. They are pivoted to the sides of the troughs, close to the housings, and are each provided with a slotted arm, $n$, which projects through a slot in the shafts $i$ $i'$, a pin, $o$, in said shafts being passed through the slot in arms G.

When the machine is in operation the presser bars or plates are alternately lifted and lowered, first in one trough and then in the other, and in such an order that when the rake is feeding the hay or straw the presser-bar is lifted; but when the knife is acting, the presser-bar is forced down on the hay or straw, and holds it firmly for the action of the knife. This is brought about in the following manner: When one of the rakes—say $l'$—is lowered into the trough to feed the hay, as in Fig. 2, the pin $o$, pressing on the arm $n$, forces it back and lifts the presser-bar, as indicated by the solid lines, and when the motion is reversed and the rake lifted the presser-bar is forced down, clasping and pressing the hay or straw between its lower edge and the bottom of the trough, as indicated by the dotted lines in the same figure.

The object in making the trough of the peculiar shape shown and described is to present the body of hay or straw to be cut through to the knives in the most advantageous way. Thus, when the knives first act upon the hay the resistance is slight; but it increases as the force of the knife or the leverage increases, and falls off when the knife has expended its full shearing effect upon the hay.

If the troughs were not constructed in the way described, but had flat bottoms and right-angular sides, the full resistance would be encountered as soon as the knives touched the hay, not only making it more difficult to operate the machine, but necessitating the use of a longer knife than is sufficient to perform the work when the sides and bottom of the trough are inclined from the axis of the knives.

It is not essential that two troughs should be used. One may be sufficient, it being only necessary to adjust the rakes so as to feed the hay or straw alternately as the cutter is moved back and forth.

Having thus described my invention, I claim as new and desire to secure by Letters Patent—

As an improvement in hay and straw cutters, the reciprocating cutter composed of shear-cutting knives $f$ $f'$, fixed to cutter-bar $d'$, and pivoted at $d$, in combination with troughs C C', rakes $l$ $l'$, and presser bars or plates G, substantially as described.

WILLIAM ANTHONY YEATTS.

Witnesses:
F. P. HARMAN,
WM. W. KINGREA.